(12) United States Patent
Nishi et al.

(10) Patent No.: US 6,910,399 B2
(45) Date of Patent: Jun. 28, 2005

(54) TRANSMISSION OF INTERNAL COMBUSTION ENGINE

(75) Inventors: Tohru Nishi, Saitama (JP); Yoshiaki Hori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/279,868

(22) Filed: Oct. 25, 2002

(65) Prior Publication Data

US 2003/0131676 A1 Jul. 17, 2003

(30) Foreign Application Priority Data

Oct. 31, 2001 (JP) ........................................ 2001-334134

(51) Int. Cl.$^7$ ................................................ F16H 3/14
(52) U.S. Cl. ........................................... 74/377; 74/376
(58) Field of Search ........................ 74/331, 355, 361, 74/373, 376, 377

(56) References Cited

U.S. PATENT DOCUMENTS

| 3,040,408 | A | * | 6/1962 | Schou | ........................... | 74/377 |
| 3,952,606 | A | * | 4/1976 | Schulz | .......................... | 74/377 |
| 4,594,908 | A | * | 6/1986 | Akashi et al. | ............ | 74/331 X |
| 4,679,673 | A | * | 7/1987 | Yamaoka et al. | ......... | 74/377 X |
| 5,946,971 | A | * | 9/1999 | Toyota et al. | .................. | 74/331 |
| 5,970,809 | A | * | 10/1999 | Nam et al. | ................ | 74/331 X |
| 6,494,110 | B2 | * | 12/2002 | Hatakeyama | ................ | 74/331 |
| 6,513,400 | B2 | * | 2/2003 | Suzuki | ........................ | 74/331 |
| 6,647,817 | B2 | * | 11/2003 | Kobayashi | ................ | 74/331 X |

FOREIGN PATENT DOCUMENTS

| JP | 402011951 | * | 1/1990 | .................. | 74/331 |
| JP | 405272602 | * | 10/1993 | .................. | 74/331 |
| JP | 62-020936 | | 1/1996 | | |

\* cited by examiner

*Primary Examiner*—Ha Ho
(74) *Attorney, Agent, or Firm*—Birch, Stewart, Kolasch & Birch, LLP

(57) ABSTRACT

A transmission of an internal combustion engine is used in a saddle-type vehicle (buggy) for running on rough terrain. A crankshaft of the vehicle is arranged so that it is parallel with the traveling direction of the body. The transmission includes a mechanism for switching a gear for forward travel and a gear for backward travel. At least a part of the mechanism for switching the gear for forward travel and the gear for backward travel is provided between a crankcase and a crankcase cover. At least one of shafts forming the switching mechanism is partially overlapped with a main shaft or a counter shaft in the axial direction.

17 Claims, 6 Drawing Sheets

TRANSMISSION OF INTERNAL COMBUSTION ENGINE

CROSS-REFERENCE TO RELATED APPLICATION

The present application claims priority under 35 U.S.C. §119 to Japanese Patent Application No. 2001-334134, filed Oct. 31, 2001, the entire contents of which are hereby incorporated by reference.

BACKGROUND OF THE INVENTION

1. Field of the Invention

The present invention relates to a transmission of an internal combustion engine of a saddle-type vehicle (buggy) for running on rough terrain.

2. Description of Background Art

An internal combustion engine of a conventional type saddle-type vehicle is a crankshaft transverse type as disclosed in Japanese published examined patent application No. Hei8-1251. The transmission disclosed in this application is provided with a main shaft parallel to the crankshaft, a counter shaft, an intermediate shaft for forward travel, an intermediate shaft for backward travel and an output shaft.

The structure of the conventional type has a defect in that the width of a crankcase is large and the horizontally projected area of the crankcase is large because all shafts are transversely arranged in parallel. Since two intermediate shafts for forward travel and backward travel are provided and many rotating shafts are provided, many parts are required, and the weight and cost of the transmission increases. Further, since many shafts are provided, a cross section perpendicular to the shafts is larger than is desirable.

SUMMARY AND OBJECTS OF THE INVENTION

The object of the invention is to arrange all shafts in the longitudinal direction of a vehicle in order to make a transmission that is compact.

A first aspect of the present invention is based upon a transmission of an internal combustion engine in which a crankshaft is arranged in parallel with the traveling direction of the body and a mechanism for switching a gear for forward travel and a gear for backward travel is provided. In addition, at least a part of the mechanism for switching the gear for forward travel and the gear for backward travel is provided between a crankcase and a crankcase cover. Since the invention is provided with such a configuration, the horizontally projected area of the transmission can be reduced, which more effectively utilizes space.

A second aspect of the present invention is characterized in that at least one of shafts forming the switching mechanism is partially overlapped with a main shaft or a counter shaft in the axial direction. This aspect of the present invention makes it possible for the cross section perpendicular to the shafts of the transmission to be reduced, further contributing to more effective space utilization.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
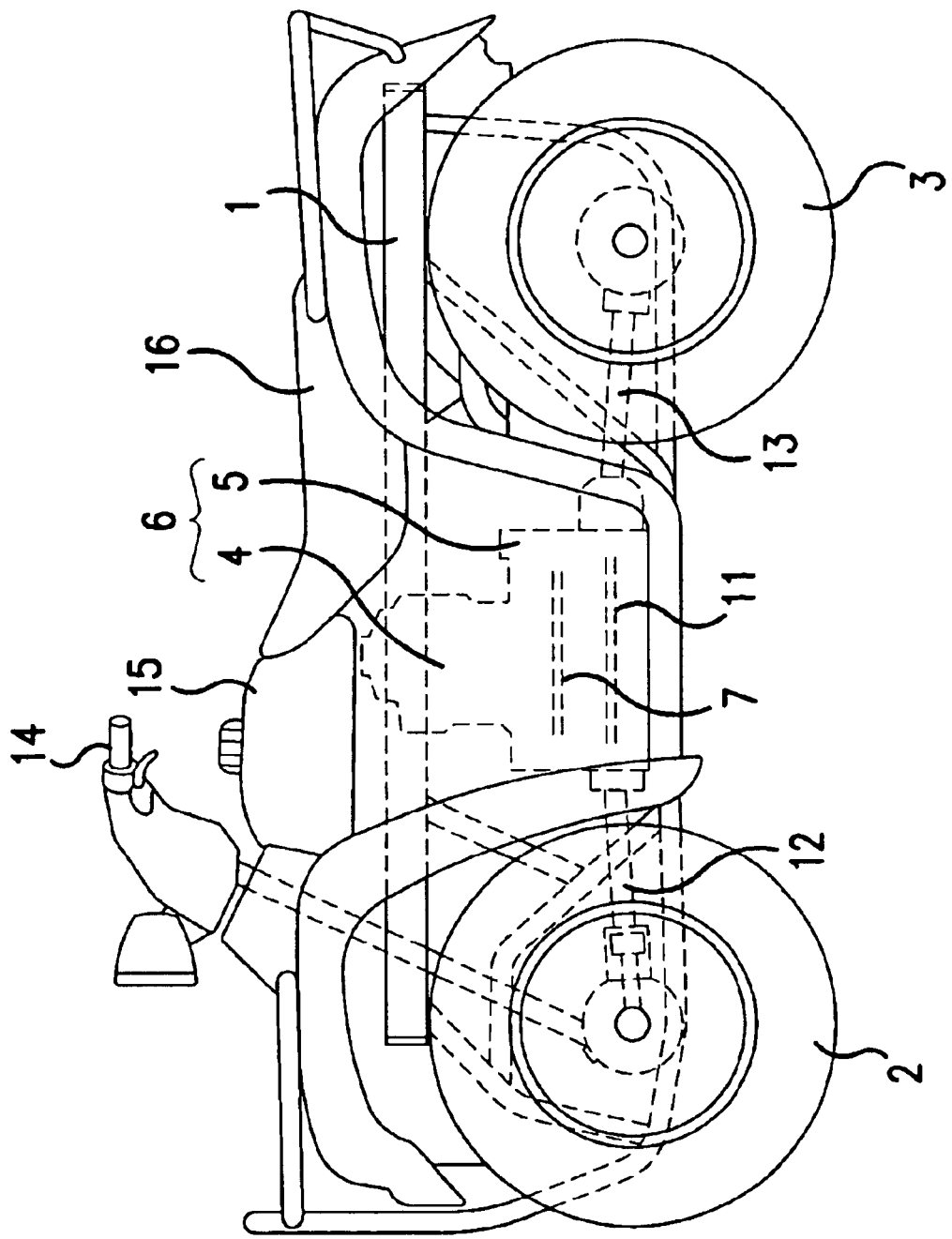
FIG. 1 is a side view showing a four-wheel buggy (a saddle-type vehicle for running on wasteland) in which an internal combustion engine according to the invention is mounted.

FIG. 1 is a side view showing a four-wheel buggy (a saddle-type vehicle for running on wasteland) in which an internal combustion engine provided with a hydraulic automatic transmission according to the invention is mounted. The buggy is provided with a pair of right and left front wheels 2 and a pair of right and left rear wheels 3 in the front and in the rear of a body frame 1 and in the center of the body frame 1, a power unit 6 in which an internal combustion engine 4 and a transmission 5 are integrated is supported.

The power unit 6 is arranged with a crankshaft 7 directed in a longitudinal direction of the body. The rotation of the crankshaft 7 is transmitted to an output shaft 11 via the main shaft 8 of the transmission, a counter shaft 9 and an intermediate shaft 10 respectively shown in FIG. 3. These shafts are parallel to the crankshaft and are arranged in the longitudinal direction of the body. The front wheel 2 is driven by a front wheel driving shaft 12 connected to the front end of the output shaft 11 and the rear wheel 3 is driven by a rear wheel driving shaft 13 connected to the rear end of the output shaft 11. On the upside of the body, a steering handlebar 14, a fuel tank 15 and a saddle-type seat 16 are equipped in order from the front.

Figure 2:
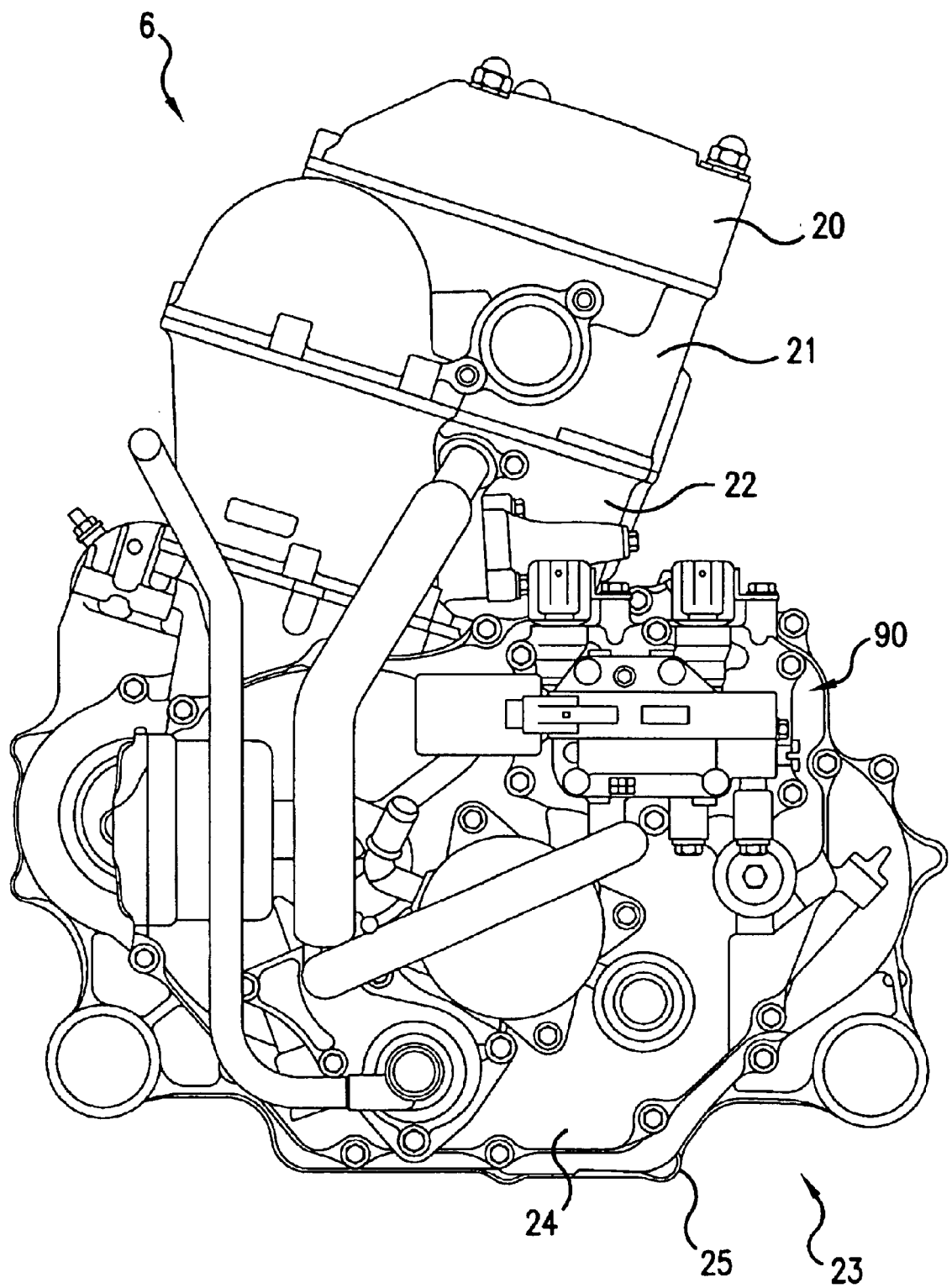
FIG. 2 is a front view showing a power unit according to the invention.

FIG. 2 is a front view showing the power unit 6 according to the invention and shows the front of the power unit 6. The body of the power unit 6 is roughly composed of four parts of a cylinder head cover 20, a cylinder head 21, a cylinder block 22 and a crankcase 23 in order from the head. The crankcase 23 is divided into four parts on a face perpendicular to the crankshaft 7 and are composed of a front crankcase cover 24, a front crankcase 25, a rear crankcase 26 and a rear crankcase cover 27 in order from the front (these are partially shown in FIGS. 4 and 5).

Figure 3:
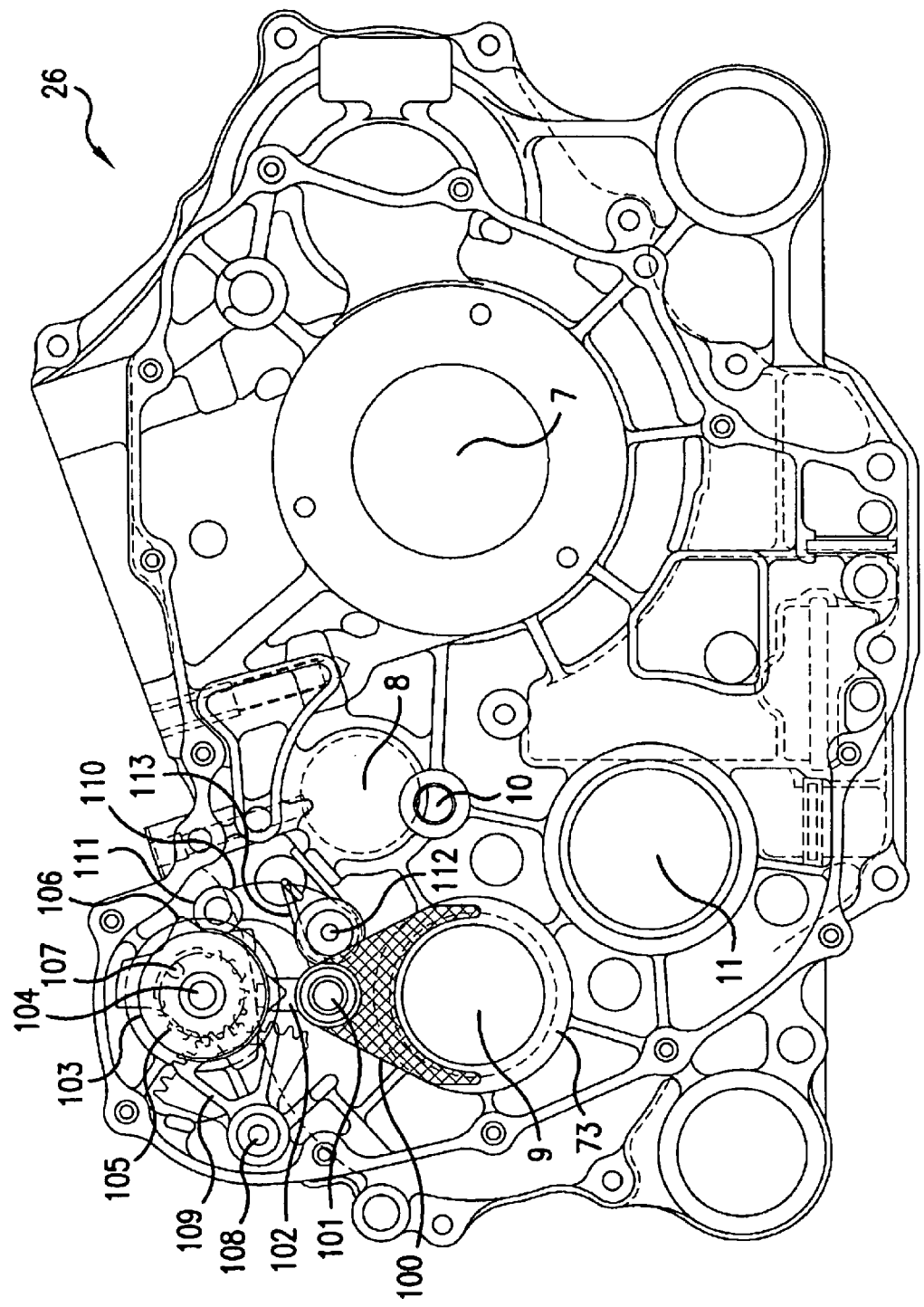
FIG. 3 shows a rear crankcase viewed from the rear.

In FIG. 2, the front crankcase cover 24 is shown and the front crankcase 25 is slightly shown in the periphery. Various equipment and piping are mounted on the front of the front crankcase cover 24. FIG. 3 shows the rear crankcase 26 viewed from the rear.

Figure 4:
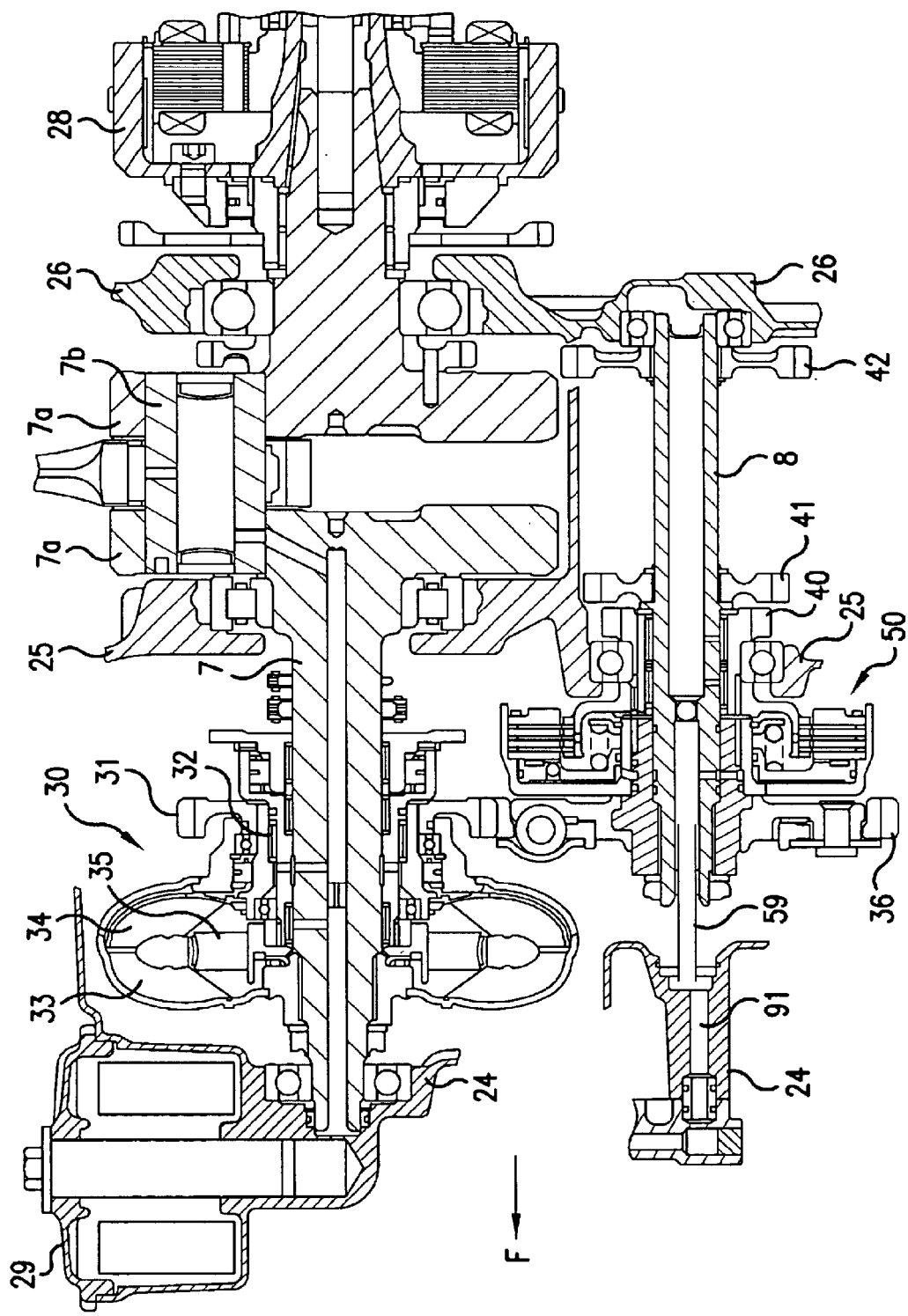
FIG. 4 is a longitudinal section of the inside of a crankcase showing relation between a crankshaft and a main shaft.
Figure 5:
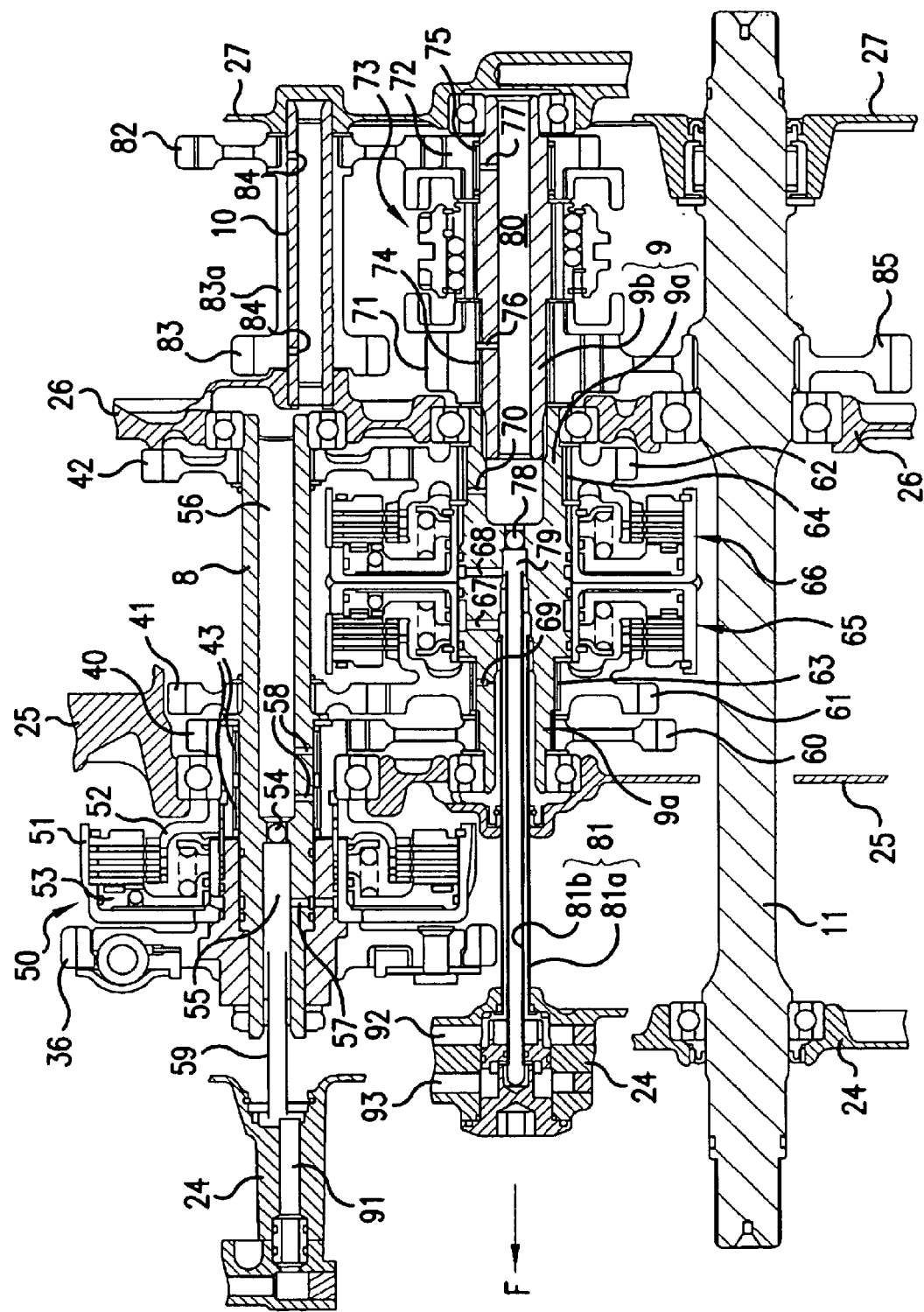
FIG. 5 is a longitudinal section of the inside of the crankcase showing relation among the main shaft, a counter shaft, an intermediate shaft and an output shaft.

In FIG. 3, each position of the crankshaft 7, the main shaft 8 of the transmission, the counter shaft 9, the intermediate shaft 10 and the output shaft 11 is shown. FIGS. 4 and 5 are longitudinal sections showing the inside of the crankcase including primary shafts in the crankcase, FIG. 4 shows relation between the crankshaft 7 and the main shaft 8 and FIG. 5 shows relation among the main shaft 8, the counter shaft 9, the intermediate shaft 10 and the output shaft 11. In these drawings, an arrow F indicates the front.

FIG. 4 shows a power transmission mechanism between the crankshaft 7 and the main shaft 8. The crankshaft 7 is supported by the front and rear crankcases 25 and 26 via a bearing. A front extended part of the crankshaft 7 is supported by the front crankcase cover 24 via a bearing. The crankshaft 7 is separated into front and rear parts and they are connected by a crankpin 7b in a crank web 7a. An alternator 28 that generates power by the rotation of the crankshaft 7 is installed at the rear end of the crankshaft 7. Also shown in FIG. 4 is an oil filter 29 provided to the front crankcase cover 24, the oil filter 29 being used for purging hydraulic fluid for a clutch.

A primary driving gear 31 is provided to the crankshaft 7 via a torque converter 30. The primary driving gear 31 is held by the crankshaft 7 via a needle bearing 32 so that the primary driving gear can be rotated. The torque converter 30 is provided with a pump impeller 33 fixed to the crankshaft 7, a turbine runner 34 opposite to the pump impeller and a stator 35. The primary driving gear 31 rotatable in relation to the crankshaft 7 is connected to the turbine runner 34 and power from the crankshaft 7 is transmitted to the primary driving gear 31 via the hydraulic fluid. A primary driven gear 36 always engaged with the primary driving gear 31 is fixed to the front end of the main shaft 8 of the transmission. The rotation of the crankshaft 7 is transmitted to the main shaft 8 via primary speed reduction by the primary driving gear 31 and the primary driven gear 36.

FIG. 5 shows the power transmission mechanism among the main shaft 8 of the transmission, the counter shaft 9, the intermediate shaft 10 and the output shaft 11. The main shaft 8 of the transmission is supported by the front and rear crankcases 25 and 26 via a bearing. A first-speed driving gear 40, a second-speed driving gear 41 and a third-speed driving gear 42 respectively different in the number of gear teeth according to gear ratio are provided to the main shaft 8. The second-speed driving gear 41 and the third-speed driving gear 42 are a fixed gear fixed to the main shaft 8, however, the first-speed driving gear 40 is supported by the main shaft 8 via a needle bearing 43 so that the first-speed driving gear can be rotated. In the following description, generally, a gear held by a needle bearing so that the gear can be rotated around a rotation axis is called an idle gear.

A hydraulic multiple disc clutch for first speed 50 is provided between the main shaft 8 and the first-speed driving gear 40. For this clutch, a clutch outer 51 is fixed to the main shaft 8 and a clutch inner 52 is connected to the first-speed driving gear 40. An axially movable pressure plate 53 is fitted to the clutch outer 51. A central hole the inside diameter of which gradually varies is provided on the center line of the main shaft 8, a steel ball 54 is press-fitted in the narrowest part and the central hole is partitioned into a front central hole 55 and a rear central hole 56. A hydraulic fluid supply hole 57 connecting the front central hole 55 and the hydraulic multiple disc clutch for first speed 50 and a lubricating oil supply hole 58 connecting the rear central hole 56 and the needle bearing 43 are provided to the main shaft 8.

Hydraulic fluid for the hydraulic multiple disc clutch for first speed 50 is fed from the side of the front crankcase cover 24 to the front central hole 55 via a hydraulic fluid supply pipe 59, as shown in FIG. 5, and is supplied to the clutch 50 via the hydraulic fluid supply hole 57. The hydraulic fluid enters between the clutch outer 51 and the pressure plate 53. The pressure plate 53 is moved by oil pressure, when the clutch is connected, the first-speed driving gear 40 is fixed to the main shaft 8 and the rotation of the main shaft 8 is transmitted to the first-speed driving gear 40. Lubricating oil to the needle bearing 43 supporting the first-speed driving gear 40 is supplied via the lubricating oil supply hole 58 from the side of the rear central hole 56.

The counter shaft 9 is an integrated counter shaft acquired by connecting a front counter shaft 9a and a rear counter shaft 9b. The counter shaft 9 is supported by the front crankcase 25, the rear crankcase 26 and the rear crankcase cover 27 via a bearing. A first-speed driven gear 60, a second-speed driven gear 61 and a third-speed driven gear 62 respectively always engaged with the first-speed driving gear 40, the second-speed driving gear 41 and the third-speed driving gear 42 respectively of the main shaft 8 are provided to the front counter shaft 9a. The first-speed driven gear 60 is a fixed gear fixed to the counter shaft. On the other hand, the second-speed driven gear 61 and the third-speed driven gear 62 are idle gears, which are supported via needle bearings 63 and 64 so that they can turn around the counter shaft 9.

A hydraulic multiple disc clutch for second speed 65 and a hydraulic multiple disc clutch for third speed 65 are provided between the counter shaft 9 and either of these idle gears. The respective clutch outers of these clutches are fixed to the counter shaft 9 and the respective clutch inners are connected to the idle gears. The configurational action of these clutches is similar to that of the hydraulic multiple disc clutch for first speed 50.

Also in these clutches, the idle of the idle gear is stopped, power can be transmitted and reduction at second or third speed is executed respectively by supplying hydraulic fluid via a hydraulic fluid supply hole 67 or 68 respectively made inside the counter shaft. Lubricating oil supply holes 69 and 70 toward the needle bearings 63 and 64 for supporting the second-speed driven gear 61 and the third-speed driven gear 62 are also made inside the counter shaft 9.

A central hole is formed inside the counter shaft 9 in which the front counter shaft 9a and the rear counter shaft 9b are integrated and is partitioned into a front central hole 79 and a rear central hole 80 by a steel ball 78 press-fitted in the narrowest part. The supply of hydraulic fluid to hydraulic multiple disc clutches for second and third speed 65 and 66 is made via a double tube 81 from the side of the front crankcase cover 24. The double tube 81 is composed of an outside tube 81a and an inside tube 81b.

Hydraulic fluid to the hydraulic multiple disc clutch for second speed 65 is supplied via a fluid passage between the outside tube 81a and the inside tube 81b and the hydraulic fluid supply hole 67. Hydraulic fluid to the hydraulic multiple disc clutch 66 for third speed 66 is supplied via a fluid passage inside the inside tube 81b and the hydraulic fluid supply hole 68. Lubricating oil to the needle bearing 63 for the second-speed driven gear 61 is supplied via an oil passage between the front counter shaft 9a and the outside tube 81a and the lubricating oil supply hole 69 from the side of the front crankcase 25. Lubricating oil to the needle bearing 64 for the third-speed driven gear 62 is supplied via the rear central hole 80 of the counter shaft 9 and the lubricating oil supply hole 70 from the side of the rear crankcase cover 27.

A driving gear for forward travel 71 and a driving gear for backward travel 72 are provided to the rear counter shaft 9b. Both the forward travel gear 71 and the backward travel gear 72 are idle gears. A manual dog clutch 73 fixed to the rear counter shaft is provided between the travel gears 71, 72, and when the dog clutch 73 is engaged to one of the travel gears, power can be transmitted. Lubricating oil supply holes 76 and 77 for supplying lubricating oil to needle bearings 74 and 75 for supporting the driving gear for forward travel 71 and the driving gear for backward travel 72 are made inside the rear counter shaft 9b. Lubricating oil to the needle bearings 74 and 75 is supplied via a rear central hole 80 of the counter shaft 9 and the lubricating oil supply holes 76 and 77 from the side of the rear crankcase cover 27.

An intermediate shaft 10 is supported by the rear crankcase 26 and the rear crankcase cover 27. A first intermediate gear 82 always engaged with the driving gear for backward travel 72 and a second intermediate gear 83 connected to the first intermediate gear 82 via a long sleeve 83a are held by the intermediate shaft 10 so that they can be turned. Lubricating oil to a part for sliding the first intermediate gear 82 and the second intermediate gear 83 of the intermediate shaft 10 is supplied via a lubricating oil supply hole 84 through a central hole of the intermediate shaft from rear crankcase 26.

The output shaft 11 is supported via a bearing by the front crankcase cover 24, the rear crankcase 26 and the rear crankcase cover 27. The output shaft 11 pierces the front crankcase 25 without being touched to the front crankcase 25. An output shaft driven gear 85 always engaged with the driving gear for forward travel 71 and the second intermediate gear 83 is fixed to the output shaft 11. The output shaft driven gear 85 is normally rotated or reversely rotated via the gear with which the dog clutch 73 is engaged and rotates the output shaft 11 in a direction suitable for the forward or backward travel of the vehicle. Reverse rotation is controlled so that it is made only when the counter shaft 9 is rotated at first speed.

The gears in the transmission are all constant-mesh gears, and depending upon which clutch of the hydraulic multiple disc clutches 50, 65, 66 is to be connected, a transmission gear ratio to be executed is determined. A valve body 90, assembled as an integrated hydraulic control unit by a solenoid valve and an oil pressure switching valve, controls oil pressure. The valve body is attached to the front of the front crankcase cover 24 as shown in FIG. 2.

For first speed 50 of the hydraulic multiple disc clutch, hydraulic fluid from the valve body 90, is fed into the front central hole 55 via the hydraulic fluid supply pipe 59 connected to the front central hole 55 of the main shaft 8 via a fluid passage 91 of the front crankcase cover 24, as shown in FIG. 5.

For second 65 or third speed 66 of the hydraulic multiple disc clutch, hydraulic fluid from the valve body 90, is fed into the front central hole 79 via the inside or outside either passage of the double tube for supplying hydraulic fluid 81 installed in the front central hole 79 of the counter shaft 9 via fluid passages 92 and 93 and is supplied to the hydraulic multiple disc clutch for second speed 65 or third speed 66, as shown in FIG. 5.

Figure 6:
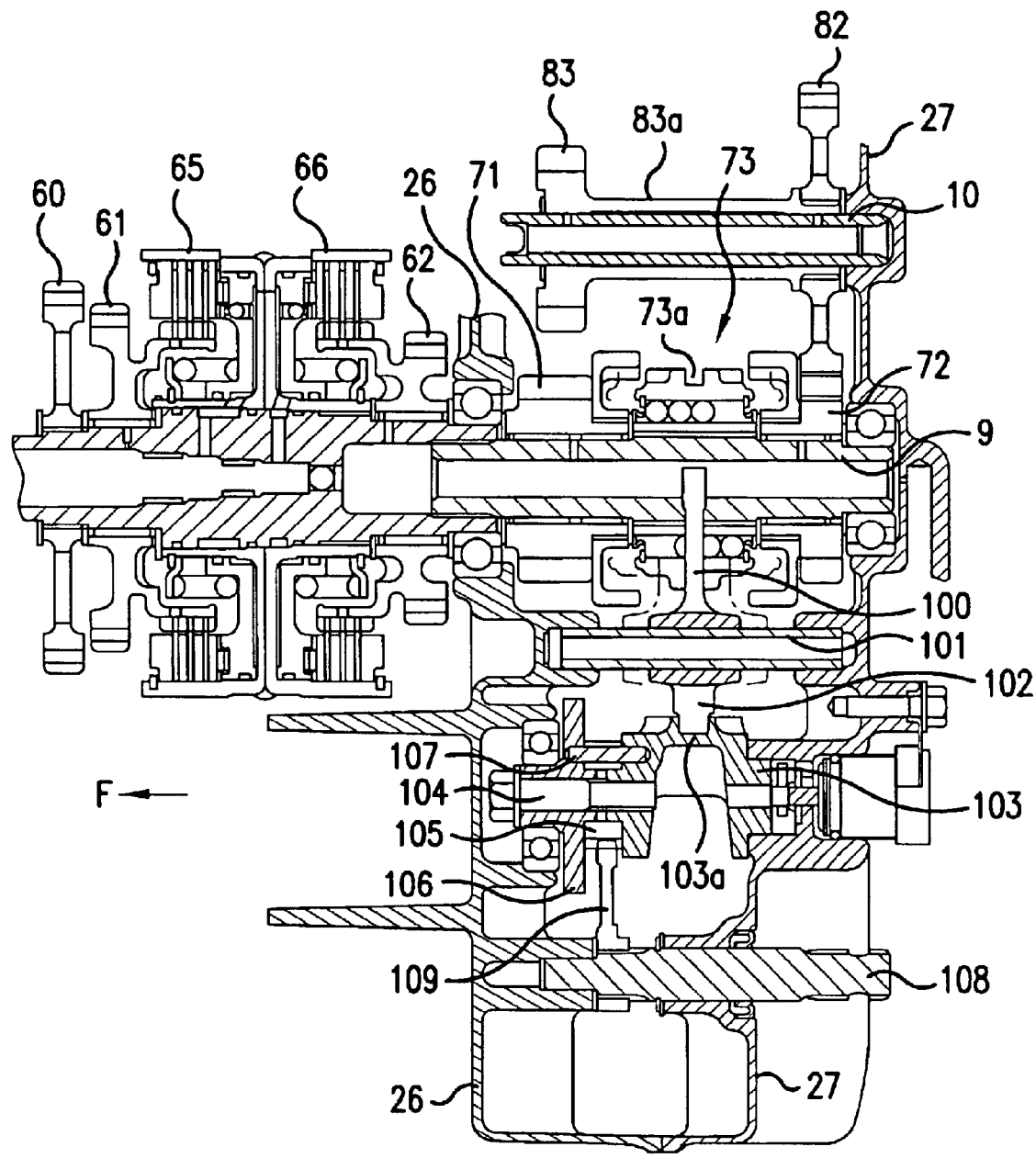
FIG. 6 is a longitudinal section showing a dog clutch driving mechanism for switching forward travel and backward travel.

A mechanism for driving the dog clutch 73 for switching the forward travel or the backward travel of the vehicle is shown in FIGS. 6 and 3. As shown in FIG. 6, a circumferential groove 73a is provided to the outside face of the dog clutch 73, and a shift fork 100 is fitted into the groove. The shift fork 100 is fitted to a guide shaft 101 so that the shift fork can be axially slid. The guide shaft 101 is a fixed shaft supported by the rear crankcase 26 and the rear crankcase cover 27. A shift pin 102 is integrated with the shift fork 100 on the reverse side of the fork and the end is fitted into a spiral groove 103a provided to a shift drum 103 so that the end can be slid.

Since the spiral groove 103a of the shift drum 103 is an approximately half round short groove, an unnecessary part of the shift drum 103 is cut to reduce the weight. The shift drum 103 is supported by a drum shaft 104. A drum driven gear 105 and a shift cam 106 are also mounted on the drum shaft 104. The shift drum 103, the drum driven gear 105 and the shift cam 106 are alternately restrained in a direction of a turn by an interlocking pin 107 so that they are integrally turned.

A shift spindle 108 is supported by the rear crankcase 26 and the rear crankcase cover 27 so that the shift spindle can be turned. A sector gear 109 engaged with the drum driven gear 105 is fixed to the shift spindle 108. When the shift spindle 108 is turned, the drum driven gear 105, the shift drum 103 and the shift cam 106 are turned together by the sector gear 109. The shift spindle 108 is connected to a shift lever (not shown) provided on the handlebar 14 of the vehicle via an operating cable (not shown) and is manually turned.

The shift cam 106 is made of a star-shaped plate as shown in FIG. 3 and a roller 111 at the end of a shift drum stopper 110 is touched to the periphery. The shift drum stopper 110 is supported by a pin 112 so that the shift drum stopper can be turned and presses the roller 111 on the periphery of the shift cam 106 by a spring 113. This mechanism functions as a turned position retainer of the shift drum 103 and when the roller 111 drops in the center of a valley of the periphery of the shift cam 106, the position of the shift drum 103 is stabilized. The stable position corresponds to each state of forward travel, neutral and backward travel.

When the shift lever provided on the handlebar 14 of the vehicle is turned from neutral to a position of forward travel or backward travel, the star-shaped gear 109 is turned together with the shift spindle 108, whereby, the drum driven gear 105 is turned and stops in a stable position of the shift cam 106. The shift drum 103 is turned around the drum shaft 104 together with the drum driven gear 105 by the action of the interlocking pin 107 in the process, and presses a shifter pin 102 at the edge of the spiral groove 103a of the peripheral surface. The shift fork 100 supported by the guide shaft 101 is pressed, is axially slid and pushes the dog clutch 73 in the axial direction of the counter shaft via the circumferential groove 73a of the dog clutch 73. At this time, a projection at the end of the dog clutch is engaged with either of the driving gear for forward travel 71 or the driving gear for backward travel 72, fixes either gear to the counter shaft 9, enables the transmission of power, and moves the vehicle forward or backward.

As described in detail above, in this embodiment, for an intermediate shaft, only the intermediate shaft for backward travel 10 provided in the medium of a power transmission path from the rear counter shaft 9b to the output shaft 11 is provided. In this configuration, the intermediate shaft 10 is arranged on the rear side of the engine substantially overlapped with the main shaft 8 when they are viewed from the top. FIG. 2 shows the intermediate shaft 10 overlapped with the main shaft 8.)

As a result of this configuration, the number of parts can be reduced, the weight can be reduced, the cost can be reduced and the horizontally projected area of the crankcase is reduced. As the switching mechanisms are provided effectively utilizing space between the crankcase and the crankcase cover, the transmission is made compact. As the intermediate shaft 10 is partially overlapped with the main shaft 8 in the direction of the main shaft, the cross-sectional area perpendicular to the longitudinal shaft is also reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission of an internal combustion engine in which a crankshaft is arranged in parallel with the traveling direction of a body, comprising:
    a main shaft of the transmission for receiving power from the crankshaft;
    a gear for forward travel;
    a gear for backward travel; and
    a mechanism for switching said gear for forward travel and said gear for backward travel, wherein at least a part of the mechanism for switching the gear for forward travel and the gear for backward travel is provided between a crankcase and a crankcase cover,
    said mechanism for switching having a plurality of shafts including an intermediate shaft and a counter shaft,
    wherein at least one of a plurality of shafts forming said mechanism for switching is not coaxial with but is parallel to and partially overlapped with the main shaft in an axial direction.

2. The transmission of the internal combustion engine according to claim 1, further comprising:
    an output shaft extending forwardly and rearwardly of the mechanism for switching and the main shaft in a longitudinal direction of the body.

3. The transmission of the internal combustion engine according to claim 1, wherein the gear for forward travel and the gear for backward travel are provided on a rear counter shaft.

4. The transmission of the internal combustion engine according to claim 3, wherein said mechanism for switching said gear for forward travel and said gear for backward travel includes a manual dog clutch fixed to said rear counter shaft, said dog clutch being provided between said gears for forward and backward travel, and when the dog clutch is engaged to one of said gears for forward or backward travel, power can be transmitted.

5. The transmission of the internal combustion engine according to claim 1, wherein the intermediate shaft is partially overlapped with the main shaft in the axial direction.

6. The transmission of the internal combustion engine according to claim 5, wherein the intermediate shaft is disposed behind the main shaft.

7. The transmission of the internal combustion engine according to claim 5, wherein the intermediate shaft is arranged on a rear side of the engine in a space between the rear crankcase and the rear crankcase cover.

8. The transmission of the internal combustion engine according to claim 1, further comprising:
    an output shaft formed as a single, unitary shaft extending forwardly and rearwardly of the mechanism for switching in a longitudinal direction of the body.

9. A transmission of an internal combustion engine in which a crankshaft is arranged in parallel with the traveling direction of a body, comprising:
    a main shaft of the transmission for receiving power from the crankshaft;
    a gear for forward travel;
    a gear for backward travel; and
    a mechanism for switching said gear for forward travel and said gear for backward travel, said mechanism for switching including a dog clutch mounted on a rear counter shaft;
    a space provided between a rear crankcase and a rear crankcase cover for housing said gears for forward and backward travel and said dog clutch; and
    an output shaft of the transmission formed as a single, unitary shaft extending forwardly and rearwardly of the mechanism for switching in a lonaitudinal direction of the body.

10. The transmission of the internal combustion engine according to claim 9, said mechanism for switching having a plurality of shafts including an intermediate shaft and a counter shaft,
    wherein at least one of a plurality of shafts forming said mechanism for switching is partially overlapped with the main shaft in an axial direction.

11. The transmission of the internal combustion engine according to claim 10, further comprising:
    a dog clutch provided between said gears for forward and backward travel, and when said dog clutch is engaged to one of said gears for forward or backward travel, power can be transmitted.

12. The transmission of the internal combustion engine according to claim 10, wherein the intermediate shaft is partially overlapped with the main shaft.

13. The transmission of the internal combustion engine according to claim 12, wherein the intermediate shaft is disposed behind the main shaft.

14. The transmission of the internal combustion engine according to claim 12, wherein the intermediate shaft is arranged on a rear side of the engine in a space between the rear crankcase and the rear crankcase cover.

15. The transmission of the internal combustion engine according to claim 12, wherein an axis of the intermediate shaft is lower than an axis of the main shaft.

16. The transmission of the internal combustion engine according to claim 9,
    wherein the output shaft extends forwardly and rearwardly of the mechanism for switching and the main shaft in a longitudinal direction of the body.

17. A transmission of an internal combustion engine in which a crankshaft is arranged in parallel with the traveling direction of a body, comprising:
    a main shaft and an intermediate shaft;
    a gear for forward travel;
    a gear for backward travel;
    a mechanism for switching said gear for forward travel and said gear for backward travel, wherein at least part of the mechanism for switching the gear for forward travel and the gear for backward travel is provided between a crankcase and a crankcase cover; and
    an output shaft extending forwardly and rearwardly of the mechanism for switching, the main shaft, and the intermediate shaft in a longitudinal direction of the body,
    wherein the intermediate shaft is disposed behind the main shaft and partially overlaps the main shaft in an axial direction.

* * * * *